(12) United States Patent
Luo et al.

(10) Patent No.: US 10,057,944 B2
(45) Date of Patent: Aug. 21, 2018

(54) APPARATUS AND METHODS FOR CONVEYING AND HEATING OBJECTS

(75) Inventors: Jiangbo Luo, Zhejiang (CN); Xiaoqun Lou, Zhejiang (CN)

(73) Assignee: YIWU EASY OPEN END INDUSTRIAL CORP., Yiwu (CN)

( * ) Notice: Subject to any disclaimer, the term of this patent is extended or adjusted under 35 U.S.C. 154(b) by 1432 days.

(21) Appl. No.: 12/953,126

(22) Filed: Nov. 23, 2010

(65) Prior Publication Data

US 2011/0120988 A1    May 26, 2011

(30) Foreign Application Priority Data

Nov. 23, 2009   (WO) ................ PCT/CN2009/001294

(51) Int. Cl.
| B65G 15/14 | (2006.01) |
| H05B 6/16 | (2006.01) |
| H05B 6/10 | (2006.01) |

(52) U.S. Cl.
CPC ............. H05B 6/103 (2013.01); B65G 15/14 (2013.01)

(58) Field of Classification Search
CPC ......... B65G 15/14; B65G 15/12; H05B 6/103
USPC ............... 198/618, 626.1; 219/653, 700, 388
See application file for complete search history.

(56) References Cited

U.S. PATENT DOCUMENTS

| 1,807,312 | A | * | 5/1931 | Henley, Jr. .......... | A47J 37/0857 |
| | | | | | 198/416 |
| 3,911,593 | A | | 10/1975 | Colapinto | |
| 3,974,353 | A | * | 8/1976 | Goltsos .................. | H05B 6/782 |
| | | | | | 219/700 |
| 4,095,390 | A | * | 6/1978 | Knudsen ................ | B65B 7/168 |
| | | | | | 156/379.8 |
| 4,198,901 | A | * | 4/1980 | Knudsen .................. | B31B 1/02 |
| | | | | | 198/626.1 |
| 4,209,917 | A | | 7/1980 | Johnson | |
| 4,288,673 | A | * | 9/1981 | Ishibashi ................ | B29C 35/08 |
| | | | | | 219/633 |
| 4,614,045 | A | * | 9/1986 | Nagasawa ............... | F26B 21/04 |
| | | | | | 34/309 |
| 4,902,184 | A | * | 2/1990 | Fritz ...................... | B65G 57/14 |
| | | | | | 198/626.1 |

(Continued)

FOREIGN PATENT DOCUMENTS

| CN | 1103042 C | 3/2003 |
| CN | 101221013 | 7/2008 |

(Continued)

OTHER PUBLICATIONS

International Search Report for International Application No. PCT/CN2009/001294 dated Sep. 2, 2010 and Written Opinion dated Aug. 20, 2010.

*Primary Examiner* — Tu B Hoang
*Assistant Examiner* — Diallo I Duniver
(74) *Attorney, Agent, or Firm* — Finnegan, Henderson, Farabow, Garrett & Dunner, LLP

(57) ABSTRACT

Apparatuses and methods are disclosed for heating objects. The apparatus may include two conveyer belts. Each conveyer belt may include a plurality of teeth. At least a portion of the two conveyer belts may be in parallel to each other. In the parallel portion, the conveyer belts may include opposite teeth that are symmetrical to each other and the object may be fitted in the opening of the symmetrical teeth and secured by the surrounding teeth.

5 Claims, 11 Drawing Sheets

(56) References Cited

U.S. PATENT DOCUMENTS

| | | | | |
|---|---|---|---|---|
| 5,044,264 | A * | 9/1991 | Forney | 99/349 |
| 5,785,169 | A * | 7/1998 | Egger | B65G 51/035 |
| | | | | 198/493 |
| 6,036,943 | A * | 3/2000 | Fischer | A61C 5/00 |
| | | | | 424/49 |
| 6,233,841 | B1 * | 5/2001 | Beach | 34/262 |
| 2007/0163622 | A1 * | 7/2007 | Avelis | B08B 9/42 |
| | | | | 134/22.1 |
| 2008/0086091 | A1 * | 4/2008 | Anderson | A61M 5/31511 |
| | | | | 604/192 |
| 2008/0178966 | A1 * | 7/2008 | Bigsby et al. | 144/360 |
| 2009/0095766 | A1 * | 4/2009 | Trainello | B65D 51/10 |
| | | | | 220/810 |
| 2010/0072194 | A1 * | 3/2010 | Mackay | H05B 6/782 |
| | | | | 219/679 |

FOREIGN PATENT DOCUMENTS

| | | |
|---|---|---|
| CN | 101592435 A | 12/2009 |
| CN | 101594711 A | 12/2009 |
| EP | 0100427 A1 | 2/1984 |
| FR | 1073689 A | 9/1954 |
| JP | 2009109070 A | 5/2009 |
| WO | WO 9323970 A1 | 11/1993 |

* cited by examiner

APPARATUS AND METHODS FOR CONVEYING AND HEATING OBJECTS

CROSS REFERENCES TO RELATED APPLICATIONS

The present invention contains subject matter related to International Patent Application No. PCT/CN2009/001294 filed in the Chinese Patent Office on Nov. 23, 2009. The entire contents of which are incorporated herein by reference.

TECHNICAL FIELD

The present invention relates to apparatuses and methods for conveying and heating objects. More particularly, the present invention relates to apparatuses and methods for conveying and inductively heating objects.

BACKGROUND

During manufacture of containers of food, beverage, tea, etc., it is usually required to apply antiseptic gels to the closures of the containers, such as can lids, in order to enhance the antirust property of the closures. After applying antiseptic gels, the closures need to be dried, usually in a drying chamber. Such closures are usually made of thin pieces of metal, and of light weight. Traditionally, these thin piece closures are conveyed by flat belts to and from drying chamber, on which closures are easily hit and/or stick to each others, significantly lowering the quality of the impacted closures.

Chinese Patent Application Publication No. CN101221013, published on Jul. 16, 2008, discloses a method for drying can lids using a high-frequency induction stove. In this method, can lids are conveyed in the induction stove while in a magnetic suspension state. A photoelectric displacement sensor is used to transfer the displacement information of the can lids to a control system, thereby heating the can lids in a controllable manner. However, the implementation of magnetic suspension complicates the system design. Moreover, due to differences in the shape and/or weight of can lids, different control schemes have to be adopted, thus making the conveying process rather difficult to control.

Traditionally, thin piece metal closures, such as can lids, are dried when they are conveyed through a resistive heating tube or gas heating chamber. Such drying/heating methods suffer from high energy consumption and long drying period. In addition, because the antiseptic gels are usually adhesive, closures may stick together after dried by such traditional methods, lowering the product quality. Chinese Patent Application Publication No. CN1103042C, published on Mar. 12, 2003, discloses a method similar to the traditional ones.

SUMMARY

Some disclosed embodiments may involve apparatuses for heating objects. The apparatuses may include a first and second conveyer belts. Each of the first and second conveyer belts may include a plurality of teeth. At least a portion of the first and second conveyer belts may be in parallel to each other. In the parallel portion of the first and second conveyer belts, the first conveyer belt may include a first and second teeth which are adjacent to each other, the second conveyer belt may include a third and forth teeth which are adjacent to each other. The first and third teeth, and the second and forth teeth, respectively, may be configured to face symmetrically to each other with respect to a center plane between the parallel portion of the first and second conveyer belts. A spacing between the first and second teeth may be substantially the same as a spacing between the third and forth teeth, and the spacing may be substantially the same as a thickness of the object. The apparatuses may also include a driving device configured to drive the first and second conveyer belts such that in the parallel portion, the first and second conveyer belts move synchronously. Moreover, the apparatuses may further include an electromagnetic heating device configured to at least partially enclose the parallel portion of the first and second conveyer belts, and to heat the object secured by the first, second, third, and forth teeth.

Another aspect disclosed in some exemplary embodiments may involve a method for heating objects. The method may include a step of providing a first and second conveyer belts. Each of the first and second conveyer belts may include a plurality of teeth. At least a portion of the first and second conveyer belts may be in parallel to each other. In the parallel portion of the first and second conveyer belts, the first conveyer belt may include a first and second teeth which are adjacent to each other, the second conveyer belt may include a third and forth teeth which are adjacent to each other. The first and third teeth, and the second and forth teeth, respectively, may be configured to face symmetrically to each other with respect to a center plane between the parallel portion of the first and second conveyer belts. A spacing between the first and second teeth may be substantially the same as a spacing between the third and forth teeth, and the spacing may be substantially the same as a thickness of the object. The method may also include driving the first and second conveyer belts such that in the parallel portion, the first and second conveyer belts move synchronously. The method may further include heating, using an electromagnetic heating device configured to at least partially enclose the parallel portion of the first and second conveyer belts, the object secured by the first, second, third, and forth teeth.

The preceding summary is not intended to restrict in any way the scope of the claimed invention. In addition, it is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments and exemplary aspects of the present invention and, together with the description, explain principles of the invention. In the drawings.

DESCRIPTION OF EXEMPLARY EMBODIMENTS

Reference will now be made in detail to exemplary embodiments of the invention, examples of which are illustrated in the accompanying drawings. When appropriate, the same reference numbers are used throughout the drawings to refer to the same or like parts.

Figure 1:
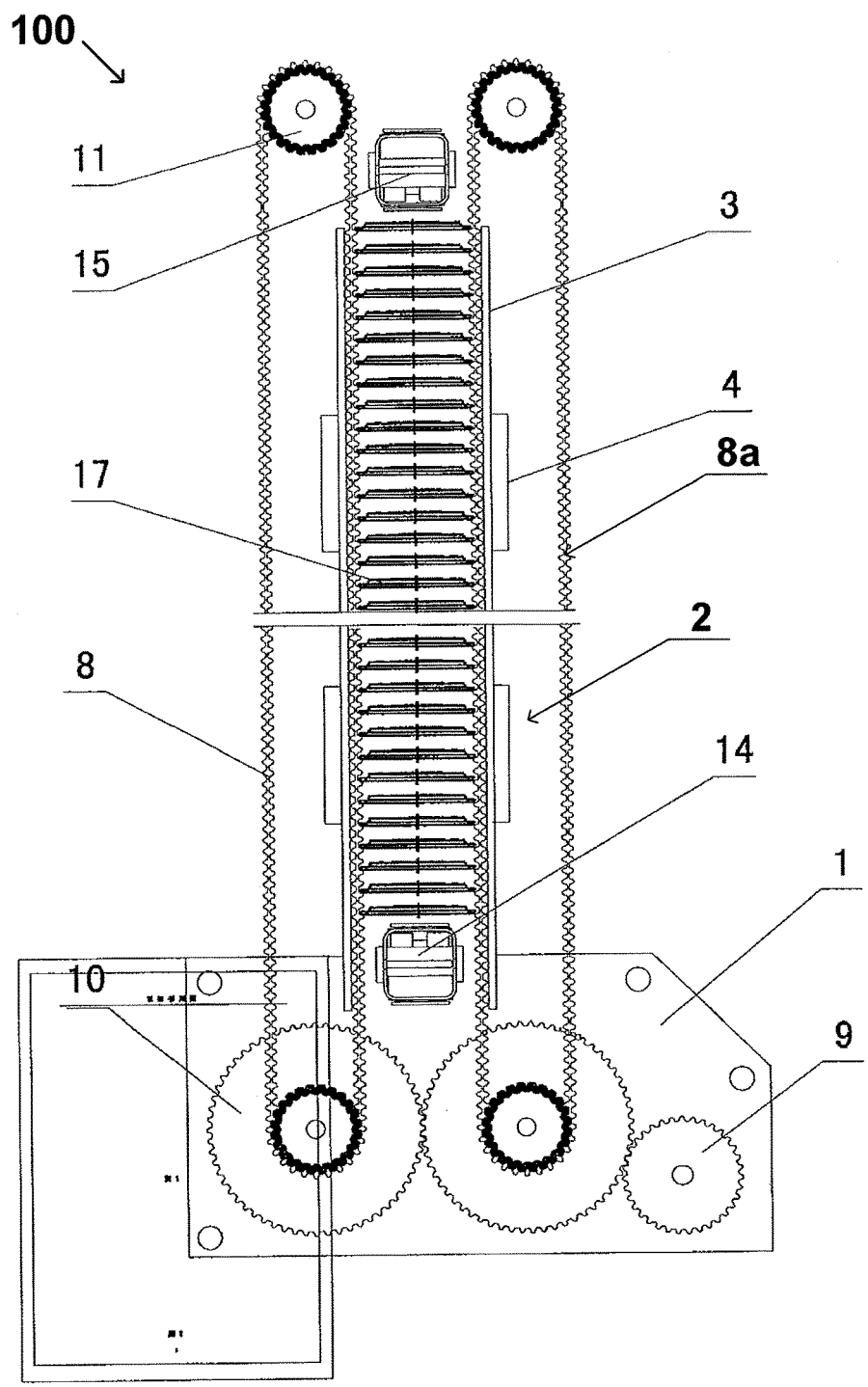
FIG. 1 illustrates an exemplary embodiment of a thin piece object heating apparatus.

Embodiments of the present disclosure may involve apparatuses and method for heating thin piece object, such as can lids, bottle caps, or other closures. FIG. 1 illustrates an embodiment of the disclosure. In FIG. 1, a thin piece object heating apparatus 100 may include two conveyer belts 8 and 8a. Each conveyer belt may include a plurality of teeth configured thereon. Apparatus 100 may also include a driving device for driving the conveyer belts. The driving device may include a driving wheel 10 and a driven wheel 11 for each conveyer belt. Driving wheel 10 may include a gearwheel coupled to the conveyer belt it drives at one end; and driven wheel 11 may include a gearwheel coupled to the conveyer belt at the opposite end. In other words, driving wheel 10 and driven wheel 11 may define two terminals of the conveyer belt that they drive. The driving wheels of conveyer belts 8 and 8a may be configured to be coupled together using associated gearwheels. The two conveyer belts may move synchronously (e.g., in a same direction with the same speed) when, for example, the two sets of driving/driven wheels for the two conveyer belts are substantially identical or symmetrical to each other. Driven wheel 11 may include a one way clutch such that it can only turn in one direction, in case when power is lost during operation. Driven wheel 11 may also be adjusted in position so that conveyer belt 8 may be tightened or loosened. A power wheel/gear 9, which may be powered by a motor or other power sources, can provide driving power to the driving wheels 10, thereby moving the conveyer belts 8 and 8a.

Between their two terminals, the two conveyer belts 8 and 8a may forms a parallel portion in which the two conveyer belts are substantially parallel to each other. For example, FIG. 1A illustrates such a parallel portion.

Figure 1A:
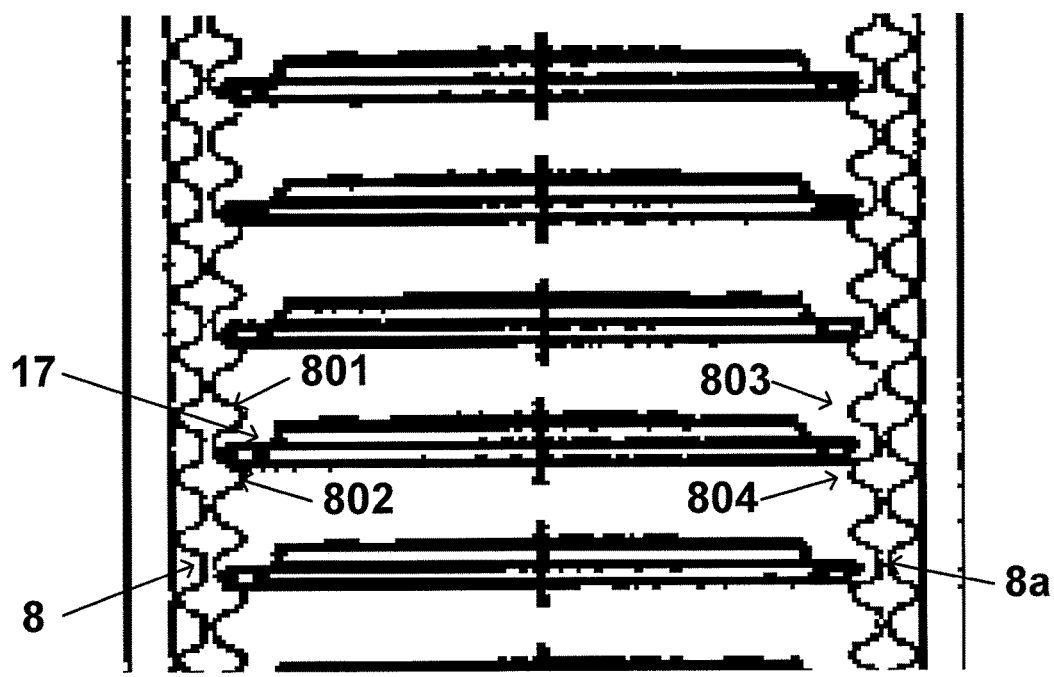
FIG. 1A illustrates an enlarged portion of FIG. 1.

Referring now to FIG. 1A, conveyer belt 8 may include teeth 801 and 802 that are adjacent to each other. Similarly, conveyer belt 8a may include teeth 803 and 804 that are adjacent to each other. In the embodiment shown in FIG. 1A, tooth 801 and tooth 803 may be configured to face each other. In addition, tooth 801 and tooth 803 may be configured to be symmetrical with respect to a center plane between conveyer belts 8 and 8a. Tooth 802 and tooth 804 may be configured in a similar manner.

Under such configuration, the recess defined by teeth 801 and 802 may also be symmetrical to the recess defined by teeth 803 and 804 with respect to the center plane. Therefore, teeth 801, 802, 803, and 804 define a hold space, which may be used to hold a thin piece object, such as object 17. When the spacing between teeth 801 and 802 is configured to be substantially the same as the spacing between teeth 803 and 804, and the spacing is further configured to be substantially the same as the thickness of the thin piece object, the thin piece object 17 may be secured in the holding space by teeth 801, 802, 803, and 804. When the thin piece object is secured by teeth 801-804, the thin piece object can be substantially held in place and may not fall off the spacing defined by teeth 801-804. When a plurality of thin piece objects are secured by the teeth located on conveyer belts 8 and 8a in such a manner, the plurality of thin piece objects may be secured and held in place by the conveyer belts 8 and 8a and move together with conveyer belts 8 and 8a. The plurality of objects may be separated by at least one tooth inbetween, thereby avoiding hitting and/or sticking among objects during conveying and/or heating process.

Referring back to FIG. 1, when the plurality of teeth on conveyer belts 8 and 8a in the parallel portion are configured in a similar manner to that shown in FIG. 1A, a plurality of thin piece objects 17 may be secured/held by the two conveyer belts at the same time. Therefore, when the driving device moves the conveyer belts synchronously, the holding space defined by the surrounding teeth can keep the same shape while moving together with the conveyer belts. Therefore, the plurality of thin piece objects 17 occupying the holding space and secured by the surround teeth 801-804 can also move without being torn.

Figure 4:
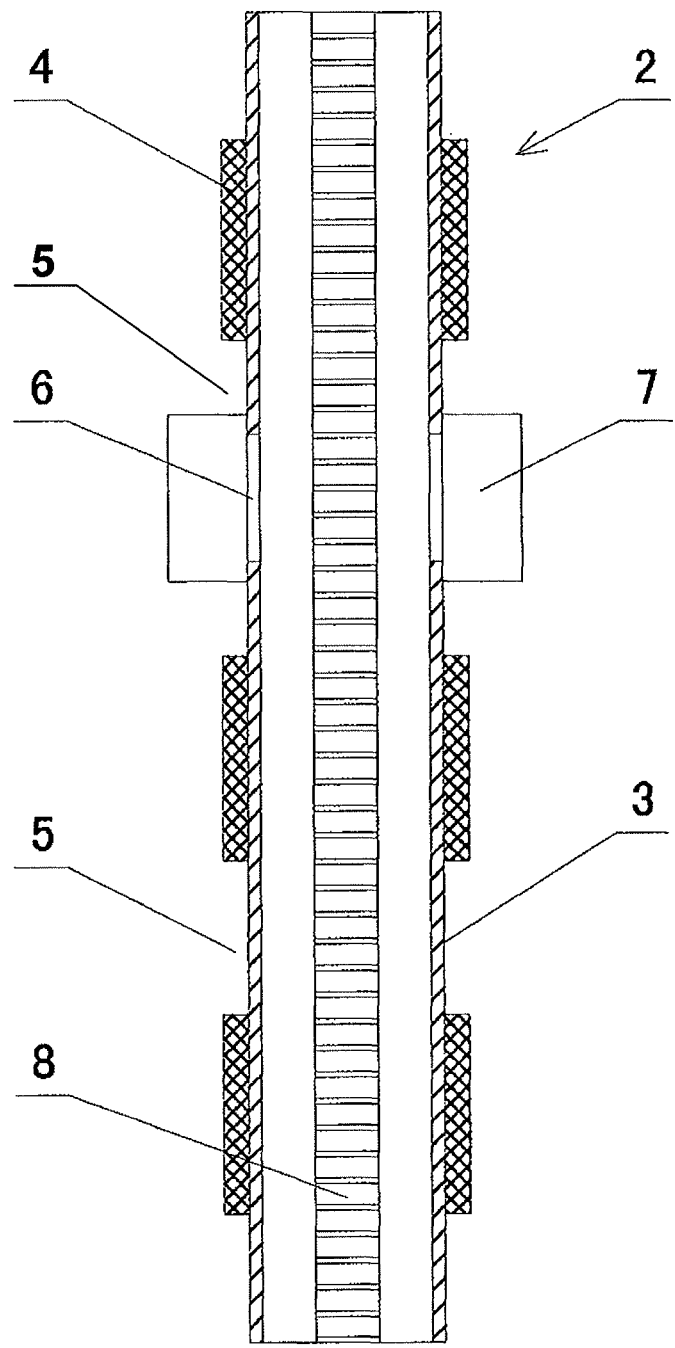
FIG. 4 illustrates a cross section view of a heating device along axial direction, in accordance with certain disclosed embodiments.

The apparatus may also include an electromagnetic heating device, such as 2 in FIG. 1, for heating the thin piece objects 17 secured by the surrounding teeth. Electromagnetic heating device 2 may be configured to at least partially enclose the parallel portion of the two conveyer belts, as shown in FIGS. 1 and 4. The electromagnetic heating device may include a tube enclosure 3 to enclose the parallel portion, and an induction coil 4 for inductively heating the thin piece object. Tube enclosure 3 may be non-electrically conductive and non-magnetically conductive. Therefore, when heating the thin piece object, which usually contains metal and/or iron, using eddy currents induced by a variable electromagnetic field, tube enclosure 3 would not be heated. In other words, tube enclosure 3 can be transparent to the electromagnetic field generated by induction coil 4. In addition, tube enclosure may be heat-resistive, withstanding heat generated by thin piece objects and/or conveyer belts.

In some embodiments, the electromagnetic heating device 2 may further include a plurality of induction coils located in a plurality of sections of the tube enclosure 3. For example, referring to FIG. 4, three sections of induction coils 4 are illustrated. Preferably, the number of induction coils can be chosen from one to six, depending on needs. In some embodiments, the induction coils can be located on the outer surface of the tube enclosure, such as 4 in FIG. 4. A buffer area may be located between adjacent sections. For example, FIG. 4 shows at least two buffer areas 5 between the three sections of induction coils. Moreover, a ventilation hole may be located in the buffer area. For example, two ventilation holes 6 are located in the upper buffer area shown in FIG. 4, and the two ventilation holes 6 may be located symmetrically with respect to a center axis of tube enclosure 3. A ventilation device, such as ventilation fan 7, may be used for air ventilation through the ventilation holes 6. In FIG. 4, conveyer belt 8 may move upward, along the center axis of tub enclosure 3.

The apparatus may also include a frame, such as frame 1 of FIG. 1, which holds the conveyer belts 8 and 8a, the driving device, the heating device 2, etc. An input belt 14 can be used to supply to be heated thin piece objects to the conveyer belts 8 and 8a; and an output belt 15 can be used to transfer the heated objects to other downstream apparatuses. It is noted that the function of 14 and 15 can be exchanged, depending on the moving direction of the conveyer belts.

Figure 2:
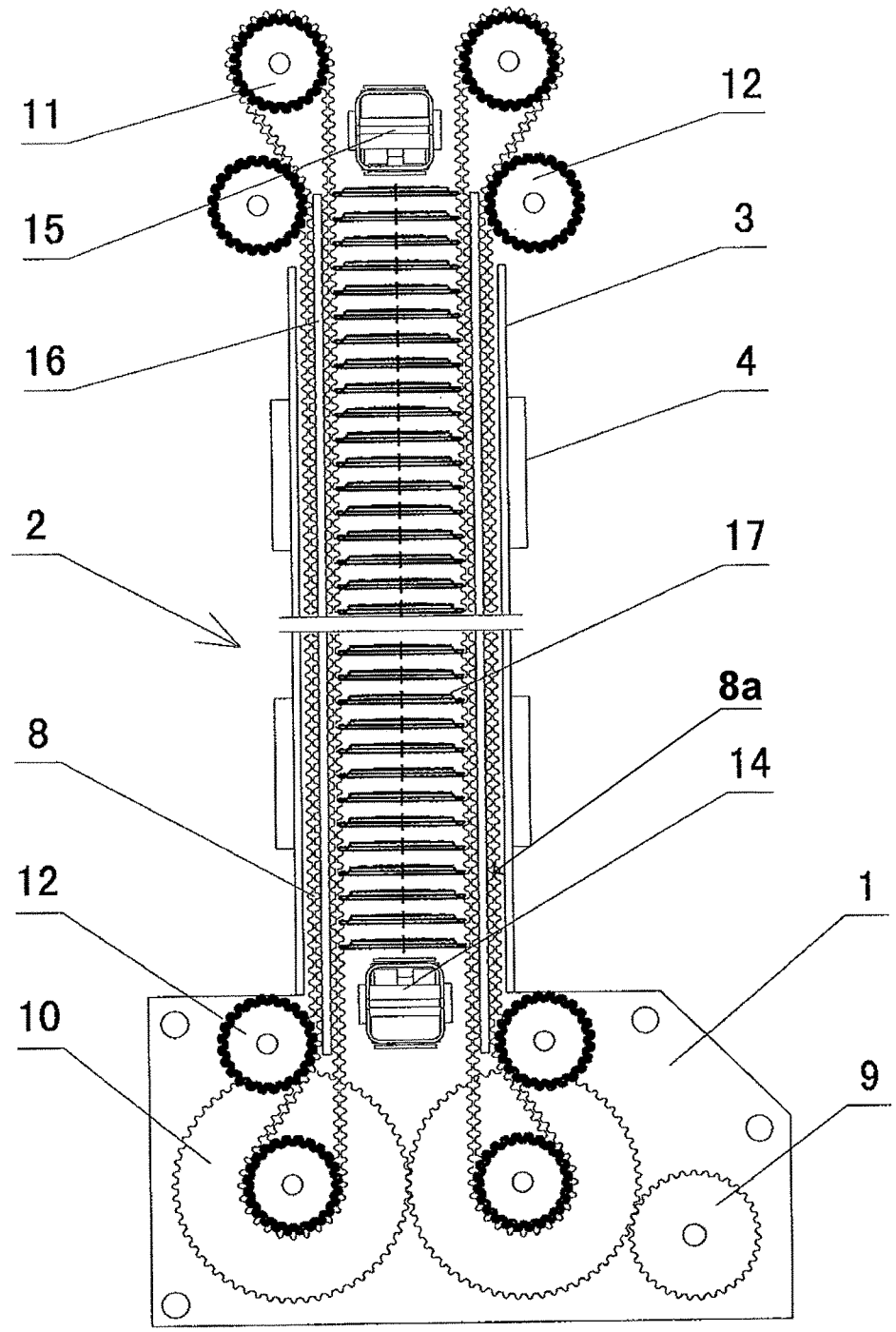
FIG. 2 illustrates another exemplary embodiment of the thin piece object heating apparatus.

FIG. 2 illustrates another embodiment of the disclosure. In this embodiment, a limiting wheel 12 is used near each of the driving/driven wheels 10, 11 to limit the space between forward and backward parallel sections of conveyer belt 8. A similar configuration is used with conveyer belt 8a. Comparing to the embodiment of FIG. 1, the embodiment shown in FIG. 2 places both the forward and backward sections of conveyer belt 8 inside tube enclosure 3. With this configuration, the temperature of the whole conveyer belt (including the forward and backward sections) can be kept more uniform. As a comparison, in FIG. 1, the forward section is inside the tube enclosure (thereby heated by the thin piece objects through heat transfer and/or the induction coils through inductive heating) and therefore is usually hotter; while the backward section is not in the tube enclosure and is usually cooler. In this embodiment, a separation board 16 can also be used to separate the forward and backward sections of conveyer belt 8. Other features of embodiment shown in FIG. 2 are the same as those shown in FIG. 1.

Figure 3:
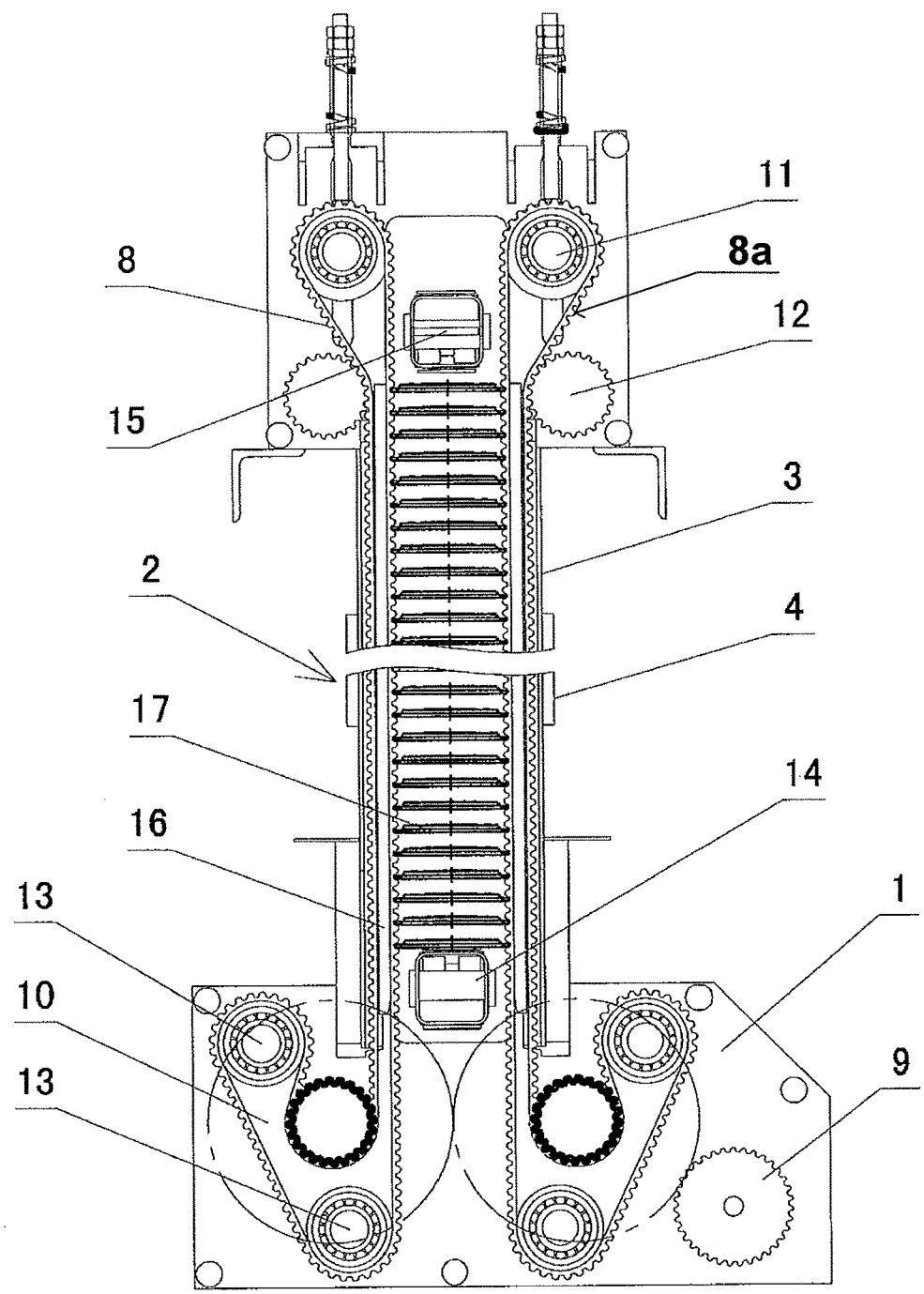
FIG. 3 illustrates yet another exemplary embodiment of the thin piece object heating apparatus.
Figure 3A:
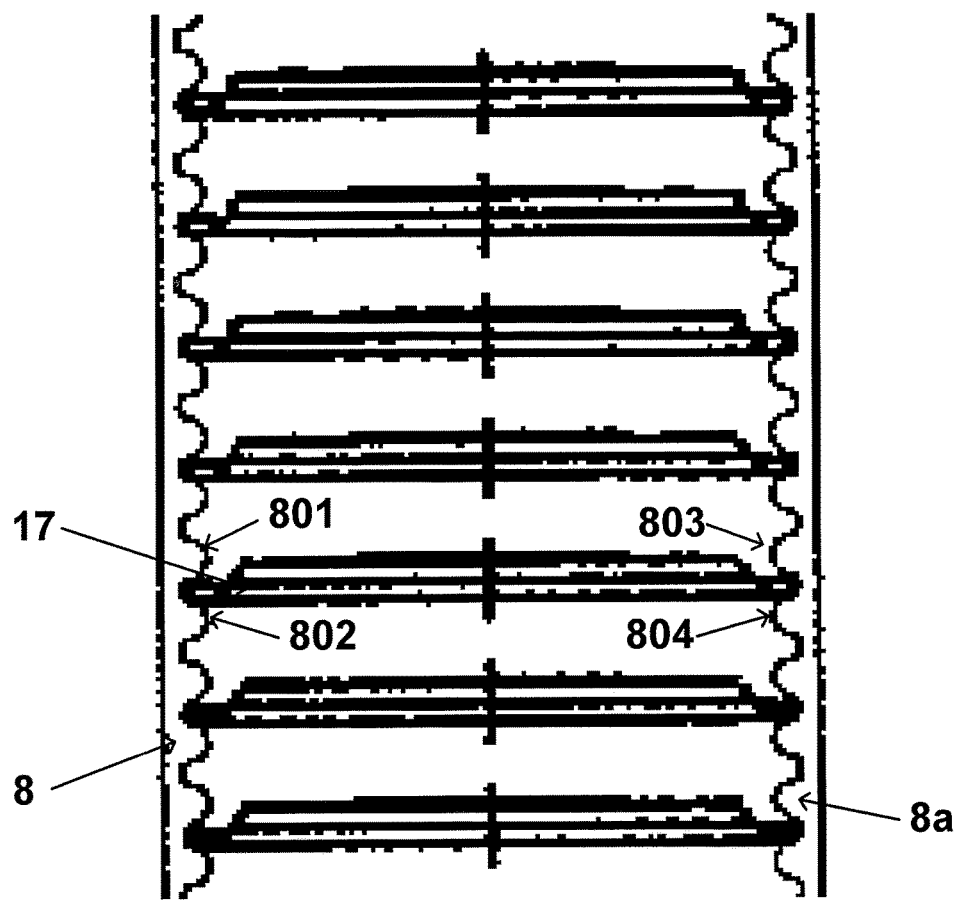
FIG. 3A illustrates an enlarged portion of FIG. 3.

FIG. 3 illustrates yet another embodiment. In FIG. 3, the plurality of teeth are located on a single side of the conveyer belt, while in FIGS. 1 and 2, the teeth are located on both sides of the conveyer belt. An enlarged view of the teeth configuration in the parallel portion of FIG. 3 is shown in FIG. 3A. It can be seen that the teeth are only on the single side of the conveyer belt 8. The configuration of teeth facing the to-be-heated thin piece object is the same as that shown in FIG. 1A.

In the embodiment shown in FIG. 3, reversing wheels 13 are used to reverse the moving direction of the conveyer belt. For example, two reversing wheels 13 are shown on each side of this embodiment. Other features are the same as those discussed in connection with FIG. 2.

Figure 5:
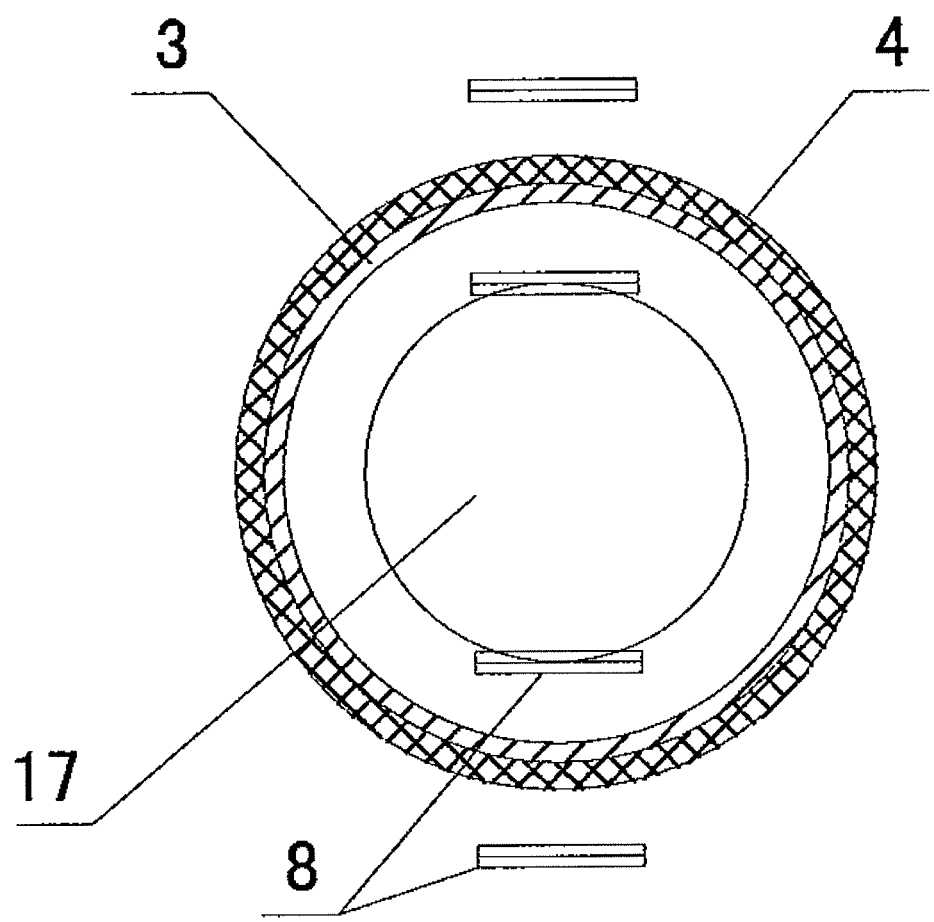
FIG. 5. illustrate a cross-section view of a heating device, in accordance with a disclosed embodiment.
Figure 6:
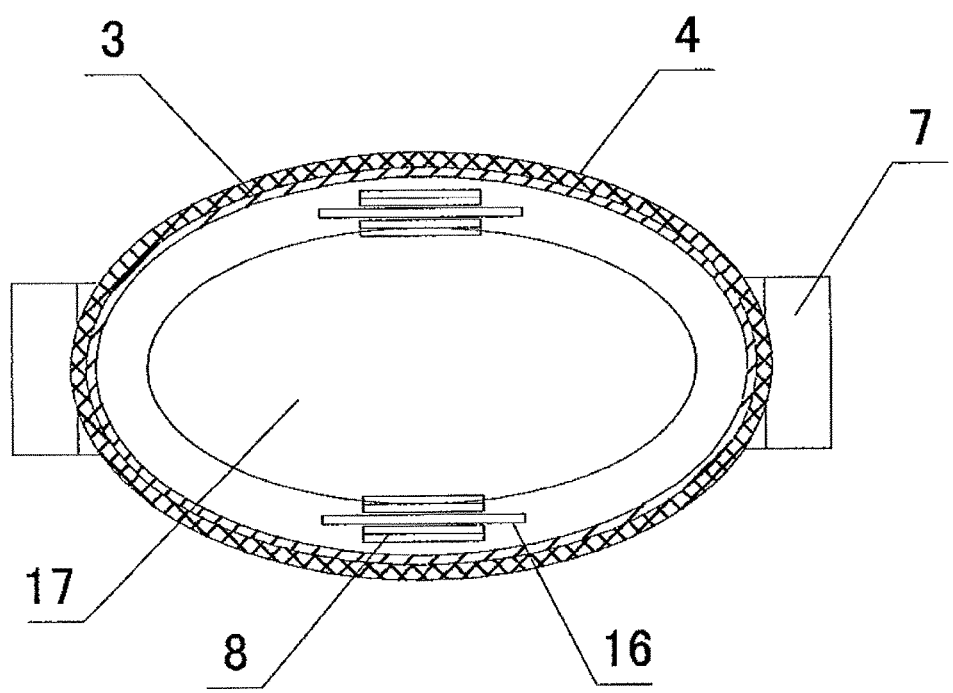
FIG. 6. illustrate a cross-section view of a heating device, in accordance with another disclosed embodiment.
Figure 7:
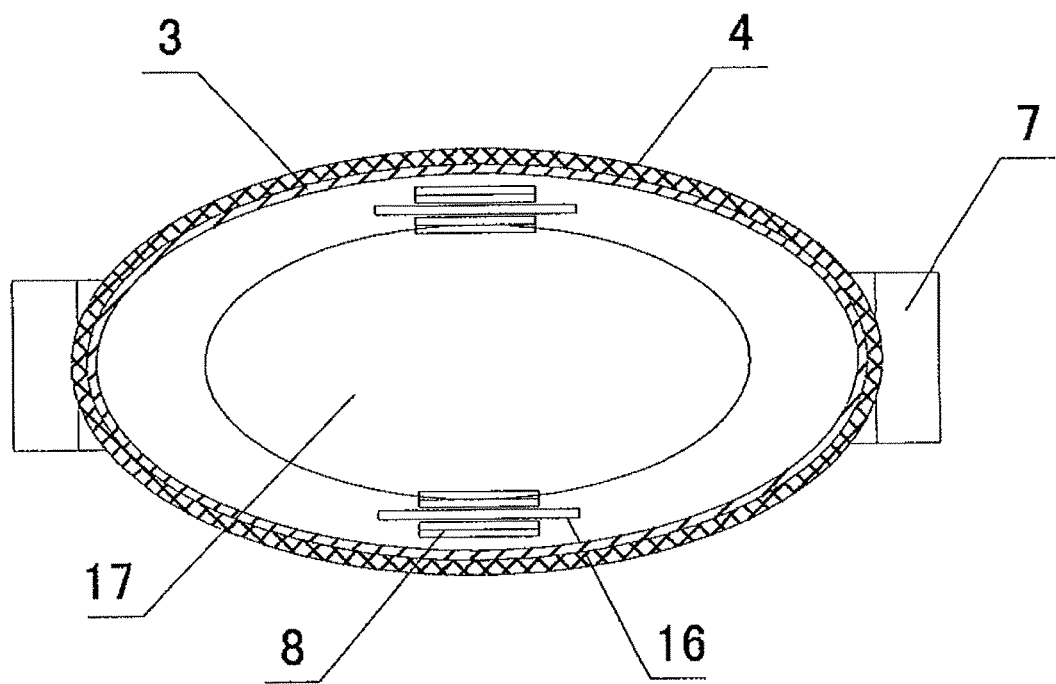
FIG. 7. illustrate a cross-section view of a heating device, in accordance with yet another disclosed embodiment.

FIGS. 5, 6, and 7 show cross section views of three different embodiments of the tube enclosure. In the embodiment shown in FIG. 5, tube enclosure 3 and induction coil 4 attached to the outer surface of tube enclosure 3 both have circular cross sections. This configuration may be suitable for heating circular objects. When a circular object is secured by the conveyer belts, it can fit into the tube enclosure. The clearance between the edge of the object and the inner surface of the tube enclosure may be substantially constant around the circumference of the object. In this way, the object can be heated evenly and easily conveyed through the tube enclosure.

In the embodiment shown in FIG. 6, tube enclosure and induction coil have non-circular cross sections in order to fit non-circular shaped object conveyed and heated therein. Similar to FIG. 5, in this embodiment the clearance between the edge of the to-be-heated object and the inner surface of the tube enclosure is substantially constant around the circumference of the object. In addition, as shown in FIG. 6, in this embodiment the conveyer belts transverse the non-circular cross section at the short diameter (minor) axis positions.

In the embodiment shown in FIG. 7, the cross section is still a non-circular shape similar to FIG. 6, but the clearance is different. Specifically, in this embodiment the ratio between a long (major) diameter and a short (minor) diameter of the non-circular cross section is larger than the ratio between a long (major) diameter and a short (minor) diameter of the non-circular shaped thin piece object. Other features are the same as those in FIG. 6. Such configuration is preferable when the object has more gels on the two short diameter sides. Of course, if the object has more gels on the two long diameter sides, opposite configuration can be utilized. For objects with other shapes, similar principles apply.

Figure 8:
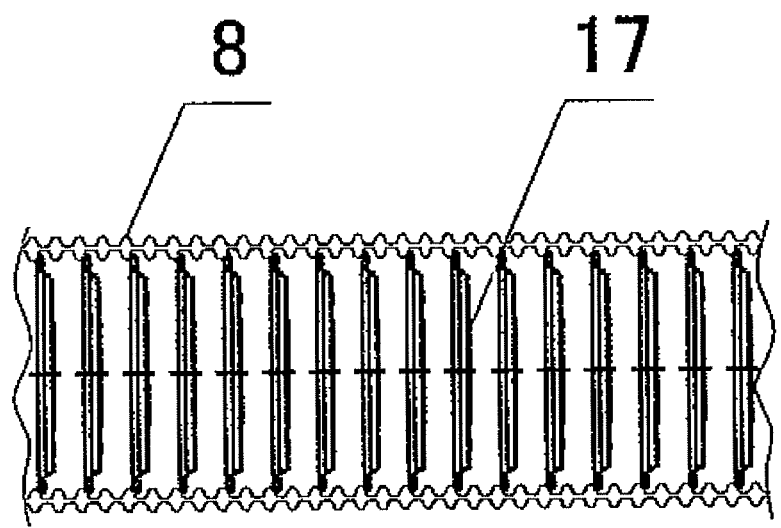
FIG. 8 illustrates a portion of the thin piece object heating apparatus, in accordance with certain disclosed embodiments.
Figure 9:
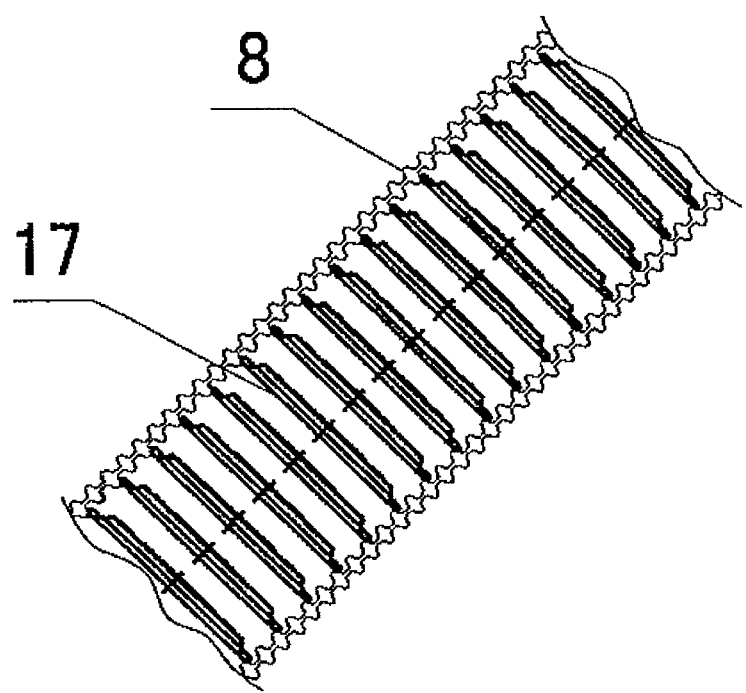
FIG. 9 illustrates a portion of the thin piece object heating apparatus, in accordance with other disclosed embodiments.

FIGS. 1-3 show embodiments in which the parallel portion of the conveyer belts is vertical (e.g., forming a right angle) to the horizontal plane. During operation, the thin piece objects are moving upward or downward. FIG. 8 shows another embodiment, in which the parallel portion is configured to be parallel to the horizontal plan. FIG. 9 shows a more general configuration, where the parallel portion forms an angle to the horizontal plane, with one conveyer belt being above the other conveyer belt. It is noted that the vertical configuration is preferred because the two conveyer belts are subject to the same gravity/driving forces in vertical direction. Therefore, it is easier to achieve synchronous movement. In addition, inductive heating is more even under vertical configuration. The embodiments shown in FIGS. 8 and 9 are suitable for conveying objects in particular direction. Considering that the thin piece objects are normally light weighted, such configuration would still be applicable when using appropriate conveyer belts. In addition, because objects are secured and separated by conveyer belts, although the gravity of these objects is in different direction than belt movement, they may not fall off the conveyer belts or stick together during conveyance and/or heating process.

In some embodiments, the two conveyer belts can be configured to be symmetrical. In addition, conveying wheels (including driving/driven wheels, limiting wheels, reversing wheels, etc.) can also be configured to be symmetrical. In this way, synchronous movement of the two conveyer belts can be assured.

Advantages of the disclosed systems include relatively lower energy consumption and relatively high efficiency, due to the utilization of inductive heating. Because thin piece objects are separated and secured by conveyer belt teeth during heating/drying, no hitting or sticking between the objects will occur, thereby significantly enhancing product quality.

In the foregoing Description of Exemplary Embodiments, various features are grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Description of the Exemplary Embodiments, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

What is claimed is:

1. A method for heating thin piece objects, comprising:
   securing an object between a first and second conveyer belts, the object having a thin piece structure, including at least a portion of a container lid or cap, and having adhesive antiseptic gels applied to at least one side of the object, wherein:

each of the first and second conveyer belts includes a plurality of teeth;

at least a portion of the first and second conveyer belts are in parallel to each other;

in the portions of the first and second conveyer belts that are in parallel to each other, the first conveyer belt includes a first and second teeth which are adjacent to each other, the second conveyer belt includes a third and fourth teeth which are adjacent to each other;

the first and third teeth, and the second and fourth teeth, respectively, are configured to face symmetrically to each other with respect to a center plane between the portions of the first and second conveyer belts that are in parallel to each other;

the first, second, third, and fourth teeth each includes a protruding portion extending toward the center plane; and a spacing between the first and second teeth is the same as a spacing between the third and fourth teeth, and the spacing is the same as a thickness of the object, the thickness of the object being measured along a moving direction of the parallel portion of the first and second conveyer belts, wherein a surface of the object is perpendicular to the moving direction of the parallel portion of the first and second conveyor belts;

holding the object in a hold space defined by the first, second, third, and fourth teeth, wherein a first edge of the object fits in a first recess of the hold space defined by the protruding portions of the first and second teeth, a second edge of the object fits in a second recess defined by the protruding portions of the third and fourth teeth, and the object is separated from an adjacent object by at least one tooth along the moving direction of the parallel portion of the first and second conveyer belts;

conveying the object secured by the first, second, third, and fourth teeth, wherein the first, second, third, and fourth teeth are perpendicular to the moving direction of the parallel portion of the first and second convey belt;

driving the first and second conveyer belts such that in the portions of the first and second conveyer belts that are in parallel to each other, the first and second conveyer belts move synchronously; and heating, using an electromagnetic heating device configured to at least partially enclose the portions of the first and second conveyer belts that are in parallel to each other, the object secured by the first, second, third, and fourth teeth.

2. The method of claim 1, wherein the first and second conveyer belts are symmetrical, and the portions of the first and second conveyer belts that are in parallel to each other are configured to be vertical to the horizontal plane.

3. The method of claim 1, wherein the first and second conveyer belts are symmetrical, and the portions of the first and second conveyer belts that are in parallel to each other are configured to form a non-right angle to the horizontal plane, wherein the first conveyer belt is above the second conveyer belt.

4. The method of claim 1, wherein the object includes a can lid or a bottle cap.

5. The method of claim 1, wherein the object includes iron.

* * * * *